United States Patent
Goloubev et al.

(10) Patent No.: US 10,656,261 B2
(45) Date of Patent: May 19, 2020

(54) UNIVERSAL METHOD FOR PRECISE PROJECTILE FLIGHT PREDICTION

(71) Applicants: Mikhail Yurievich Goloubev, Baltimore, MD (US); Matsuichiro Shimizu, Laurel, MD (US)

(72) Inventors: Mikhail Yurievich Goloubev, Baltimore, MD (US); Matsuichiro Shimizu, Laurel, MD (US)

(73) Assignee: Bowie State University, Bowie, MD (US)

( * ) Notice: Subject to any disclaimer, the term of this patent is extended or adjusted under 35 U.S.C. 154(b) by 53 days.

(21) Appl. No.: 15/974,614

(22) Filed: May 8, 2018

(65) Prior Publication Data
US 2018/0356510 A1 Dec. 13, 2018

Related U.S. Application Data

(63) Continuation-in-part of application No. 14/984,870, filed on Dec. 30, 2015, now abandoned.

(51) Int. Cl.
| | |
|---|---|
| *G01S 13/58* | (2006.01) |
| *G01S 13/88* | (2006.01) |
| *G06N 5/04* | (2006.01) |
| *G01S 7/40* | (2006.01) |
| *G01S 13/02* | (2006.01) |
| *G01S 13/72* | (2006.01) |

(52) U.S. Cl.
CPC ............ *G01S 13/58* (2013.01); *G01S 7/4026* (2013.01); *G01S 13/0218* (2013.01); *G01S 13/723* (2013.01); *G01S 13/88* (2013.01); *G06N 5/046* (2013.01); *G01S 2013/0272* (2013.01)

(58) Field of Classification Search
CPC .................................................. G01S 13/58–64
See application file for complete search history.

(56) References Cited

U.S. PATENT DOCUMENTS

| | | | | |
|---|---|---|---|---|
| 3,301,508 A | * | 1/1967 | Yamron | B64G 1/24 244/3.18 |
| 4,288,049 A | * | 9/1981 | Alpers | F41G 9/02 244/3.14 |
| 5,102,065 A | * | 4/1992 | Couderc | F41G 7/303 244/3.11 |
| 5,474,255 A | * | 12/1995 | Levita | F41G 7/303 244/3.14 |

(Continued)

*Primary Examiner* — Charlie Y Peng
(74) *Attorney, Agent, or Firm* — Bowie State University (57) ABSTRACT

Modern high velocities and altitudes of long-range projectile launch require a new device capable of predicting the exact geographic location and speed on impact instead of tracking object (or debris) by a radar all the way to the impact.

The principle of design for such device was achieved through rigorous application of the classical dynamics for non-inertial reference frame rotating with constant angular velocity.

It allowed, based on planet mass and rotational speed together with geographic coordinates and conditions of launch, to significantly improve ballistics accuracy by precisely forecasting behavior of a free falling objects or unmanned capsules in vicinity of a chosen planet under different atmospheric conditions.

Providing radar or a sensor compatibility with the proposed device, their performance will be enormously improved by enabling them to point at exact search, rescue, or evacuation area ahead of time.

1 Claim, 5 Drawing Sheets

(56) References Cited

U.S. PATENT DOCUMENTS

| | | | | |
|---|---|---|---|---|
| 6,262,680 B1* | 7/2001 | Muto | G01S 13/723 |
| | | | 244/3.1 |
| 6,498,580 B1* | 12/2002 | Bradford | F41G 3/147 |
| | | | 342/107 |
| 7,394,047 B1* | 7/2008 | Pedersen | F41G 7/30 |
| | | | 244/3.1 |
| 2010/0174475 A1* | 7/2010 | Estkowski | G01C 23/005 |
| | | | 701/120 |

* cited by examiner

Figure 3 (sheet 1)

Figure 3 (sheet 2)

Figure 3 (sheet 3)

UNIVERSAL METHOD FOR PRECISE PROJECTILE FLIGHT PREDICTION

U.S. PATENT DOCUMENTS

| | | |
|---|---|---|
| 3,748,440 July 1973 Alexander | | 235/61.5 R |
| 6,262,680 B1 June 2001 Muto September 1999 | | 382/103 |
| 7,605,747 B1 October 2006 Mookerjee et al. | | 342/90 |

OTHER PUBLICATIONS

Burnett B. "Trajectory Equations for A Six_Degree_of_Freedom Missile", FRL-TM-25, May 1962. FAA, "Coordinate Conversion", I-295 to I-312, DTFA01-88-c-00042, CDRL-EN25, Change 2, Volume I, 6 Sep. 1991.

Goloubev M., Shimizu M. "Process of Predicting Geographic Coordinates of Projectile Impact under Constant Angular Momentum", US Pending Patent, EFS ID 20677495, 2014

Isaacson J., etc., "Estimation and prediction of ballistic missile trajectories", Project AIR FORCE, RAND/MR-737-AF, 1996

Kashiwagi Y. "Prediction of ballistic missile trajectories", Memorandum37, AD728502, SRI Project 5188-305, June 1968.

Siouris G. "Missile Guidance and Control Systems", Springer, p 666, XIV, 2004

"The effects of the Coriolis force on projectile trajectories", University of British Columbia, https://www.phas.ubc.ca/~berciu/TEACHING/PHYS206/LECTURES/FILES/coriolis.pdf"

"Theory of projectile motion", http://www.marts100.com/projectile.htm

BACKGROUND OF INVENTION

The precise estimate of a projectile trajectory parameters expected in military applications, space travel, rescue and recovery missions, evacuation warnings, games and hobbies, etc. is a challenging task requiring exact analysis of the three-dimensional projectile flight. Currently existing to it solutions are rather complicated and therefore inconvenient. As cited in U.S. Pat. No. 3,748,440 solutions to two dimensional non-linear differential equations are developed in inertial coordinate systems where integrations are performed to obtain X and Y coordinates associated with Latitude and Longitude. Geometric Line of Sight angles is used in U.S. Pat. No. 6,262,680 B1 to track the target in inertial coordinate system. In U.S. Pat. No. 7,605,747 B1 position and velocity vectors are referenced to a non-inertial reference frame such as Earth Centered Earth Fixed (ECEF) when positional registration bias state vector $\delta \underline{X}$ represents the sensor position with respect to the ECEF coordinates. Other publications include introduction of either extra degrees of freedom (Burnett, 1962) in order to describe motion in orthogonal two dimensional planes, or consideration of specific initial conditions (Kashiwagi, 1968), or synchronous geo-satellite (Isaacson et al., 1996) utilizing Kalman Filter algorithm, or algorithm (Siouris, 2004) associated with projectile coordinate along its track. Simple solutions from two technical articles found in the websites are just referring to the Coriolis force to proximate the deviation from estimated locations (https://www.phas.ubc.ca/~berciu/TEACHING/PHYS206/LECTURES/FILES/coriolis.pdf and http://www.marts100.com/projectile.htm).

Lastly, programmed in MATLAB the process of reverse conversion of Sensor Target Measurements into ECEF coordinates allows predicting Sensor Target Measurements at impact location of projectile and enables the radar to direct its beam to the location (I-295 to I-312, DTFA01-88-c-00042, CDRL-EN25, Change 2, Volume I, 6 Sep. 1991).

General and precise solution to the complex problem of a projectile motion would create the grounds for designing a new device highly efficient for any application related to a projectile flight on any planet.

SUMMARY OF INVENTION

Proposed a new device allowing easily, quickly and accurately predict dependable on time location and speed of a capsule or it debris on any planet: Earth, Mars and Moon included in this application. The working principle of this device is based on developed unique and efficient method to evaluate precise geographical coordinates and speed of a projectile at any moment of its flight for a given launching conditions which could be input manually or transferred from a radar.

Manual input provides with exact parameters of impact allowing to evaluate planned launch efficiency and estimate possible impact outcome, while use of initial radar data predicts projectile flight ahead of time significantly improving radar functionality by enabling to rapidly redirect the radar beam to estimated impact location ahead of impact time.

Ability to use initial radar report provides device with the option of accounting on the mechanical distortions on a projectile flight such as projectile rotation and planet atmospheric conditions resulting in drag force.

BRIEF DESCRIPTION OF THE DRAWINGS

is shown.

DETAILED DESCRIPTION

Figure 1:
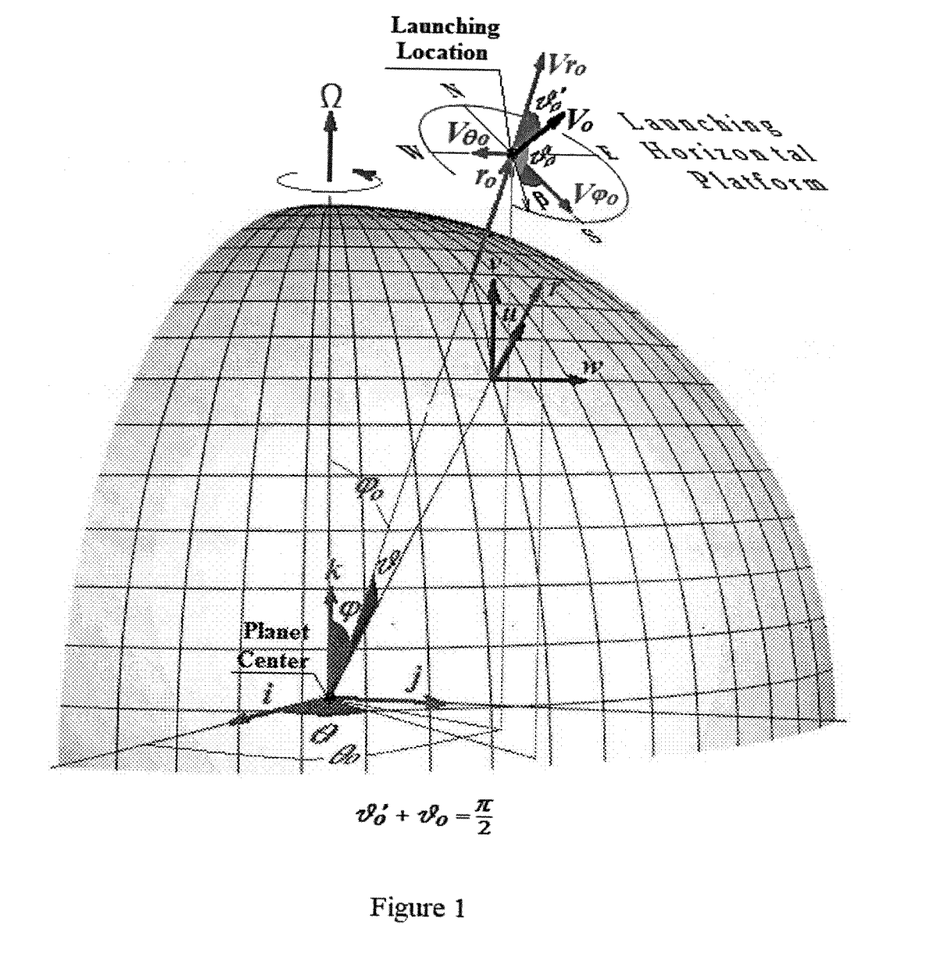
FIG. 1. Solution setup: intermediate projectile position and initial conditions relatively to Launching Horizontal Platform. ECEF Coordinate system i-j-k is replaced by spherical coordinates u-w-v. For convenience of this and further illustrations another launching angle $$\vartheta'_o = \frac{\pi}{2} - \vartheta_o$$

A: Definitions (FIG. 1)

The following definitions are useful in understanding the process of precise projectile aiming and tracing for rapidly directing the radar sensor beam to geographical impact location of objects.

$\Omega$ is a vector of angular velocity of rotating planet pointing from South-to-North;

γ is universal gravitational constant;
M is mass of the planet;
r, $r_o$, $r_1$ are respectively intermediate, launching and next to launching radial distance of a projectile measured from the planet center considered to be the origin of reference frame;
φ$φ_o$, $φ_1$ are correspondingly intermediate, initial and next to launching position projectile altitudinal angle in chosen frame of reference;
θ, $θ_o$, $θ_1$ are respectively running, launching and next to launching position projectile azimuthal angle in chosen reference frame;
$ϑ_o$ is projectile launching angle measured from launching horizontal platform. It is positive when measured in counterclockwise direction;
$V_o$ is projectile launching velocity;
$V_{ro}$, $V_{θo}$ and $V_{φ0}$ are radial, azimuthal and altitudinal components of launching velocity correspondingly
β is bearing angle (direction of launch). It is positive when measured counterclockwise from south direction (i.e. from south- to east- to north);
$L^2$ is the square of magnitude of constant total projectile angular momentum B: Development of Relevant Solutions When projectile velocity way below speed of light, unique solutions for its motion can be developed through application of classical mechanics:
According to the Second Newton's Law general equation of projectile dynamics in non-inertial frame of reference, which rotates with constant angular velocity Ω, is $$-\gamma \frac{M}{r^3} r - 2 \cdot \Omega \times V - \Omega \times (\Omega \times r) = \frac{d\vec{V}}{dt}, \quad \text{(Eq. 1)}$$

where $$-\gamma \frac{mM}{r^3} r$$

is gravitational force;
2·δ×V is Coriolis force;
Ω×(Ω×r) is centrifugal force.
Introduction of radial unit vector u and its derivatives:

$$u = \sin\varphi \cdot \cos\theta \cdot i + \sin\varphi \cdot \sin\theta \cdot j + \cos\varphi \cdot k; \ u^2 = 1$$

$$\frac{\partial u}{\partial \varphi} = w = \cos\varphi \cdot \cos\theta \cdot i + \cos\varphi \cdot \sin\theta \cdot j - \sin\varphi \cdot k; \ w^2 = 1$$

$$\frac{\partial w}{\partial \varphi} = -u = -\sin\varphi \cdot \cos\theta \cdot i - \sin\varphi \cdot \sin\theta \cdot j - \cos\varphi \cdot k$$

$$\frac{\partial u}{\partial \theta} = v = -\sin\varphi \cdot \sin\theta \cdot i + \sin\varphi \cdot \cos\theta \cdot j + 0 \cdot k; \ v^2 = \sin^2\varphi$$

$$\frac{\partial v}{\partial \theta} = \sigma = -\sin\varphi \cdot \cos\theta \cdot i - \sin\varphi \cdot \sin\theta \cdot j + 0 \cdot k$$

$$\frac{\partial v}{\partial \varphi} = \frac{\partial w}{\partial \theta} = \delta = -\cos\varphi \cdot \sin\theta \cdot i + \cos\varphi \cdot \cos\theta \cdot j + 0 \cdot k$$

$$du = \frac{\partial u}{\partial \varphi} \cdot d\varphi + \frac{\partial u}{\partial \theta} \cdot d\theta = w \cdot d\varphi + v \cdot d\theta$$

$$dw = \frac{\partial w}{\partial \varphi} \cdot d\varphi + \frac{\partial w}{\partial \theta} \cdot d\theta = -u \cdot d\varphi + \delta \cdot d\theta$$

$$dv = \frac{\partial v}{\partial \varphi} \cdot d\varphi + \frac{\partial v}{\partial \theta} \cdot d\theta = \delta \cdot d\varphi + \sigma \cdot d\theta$$

as well as taking into consideration that r=r·u and $$V = \frac{dr}{dt} = \dot{r} \cdot u + r \cdot \dot{\varphi} \cdot w + r \cdot \dot{\theta} \cdot v,$$

where altitudinal angular speed $$\dot{\varphi} = \frac{d\varphi}{dt}$$

while azimuthal angular speed $$\dot{\theta} = \frac{d\theta}{dt},$$

modifies Eq.1 as:

$$\left(-\gamma \frac{M}{r^2} + \Omega^2 r\right) \cdot u - 2 \cdot \Omega \times V - r\Omega \cdot (\Omega \cdot u) =$$
$$(\ddot{r} - r\dot{\varphi}^2)u + (2\dot{r}\dot{\varphi} + r\ddot{\varphi})w + (2\dot{r}\dot{\theta} + r\ddot{\theta})v + 2r\dot{\varphi}\dot{\theta}\delta + r\dot{\theta}^2\sigma$$

$r\dot{\theta}^2\sigma$ Consequent dot multiplication of this equation first by v, then by w and u correspondingly provides with:

$$\frac{dr}{r} = -\frac{d(\sin\varphi)}{\sin\varphi} - \frac{d\dot{\theta}}{2 \cdot (\Omega + \dot{\theta})} \quad \text{(Eq. 2)}$$

$$\left[\frac{\dot{\varphi}}{(\dot{\theta} + \Omega) \cdot \sin^2\varphi}\right] \cdot d\left[\frac{\dot{\varphi}}{(\dot{\theta} + \Omega) \cdot \sin^2\varphi}\right] = \frac{d(\sin\varphi)}{\sin^3\varphi} \quad \text{(Eq. 3)}$$

$$\dot{r} d\dot{r} - r[\dot{\varphi}^2 + (\dot{\theta} + \Omega)^2 \sin^2\varphi] \cdot dr + \gamma \frac{M}{r^2} \cdot dr = 0 \quad \text{(Eq. 4)}$$

Solution of Eqs.2 and 3 leads to the conclusion that $r^4 [\dot{\varphi}^2 + (\dot{\theta} + \Omega)^2 \sin^2 \varphi]$=const
This constant is actually squared magnitude of projectile angular momentum:

$$L^2 = r^4[\dot{\varphi}^2 + (\dot{\theta} + \Omega)^2 \sin^2\varphi] = \text{const} \quad \text{(Eq.5)}$$

which could be defined as $$L = r^2[\dot{\varphi} w + (\dot{\theta} + \Omega) v] \quad \text{(Eq.6)}$$

Altitudinal component $L_\varphi = \dot{\varphi} w$ of angular momentum in not affected by rotational frame of reference and is the same as it would be in inertial frame, while azimuthal component $L_\theta$ consists of two coaxial vectors: angular momentum $L'_\theta = \dot{\theta} v$ projectile would have in inertial frame and additional component $L_\Omega = \Omega v$ due to reference frame rotation. Magnitude of angular momentum remains constant, but its direction is constantly changing so its rotating vector creates conic surface.

Substitution Eq.5 into Eq.4 reveals energy $-e$ conservation in non-inertial frame of reference:

$$\frac{\dot{r}^2}{2} + \frac{L^2}{2 \cdot r^2} - \gamma\frac{M}{r} = \frac{V^2}{2} - \gamma\frac{M}{r} = -e \quad \text{(Eq. 7)}$$

Vector of projectile velocity V contains radial $V_r = \dot{r}u$, altitudinal $V_\varphi = r\dot{\varphi}w$, and azimuthal $V_\theta = r(\dot{\theta}+\Omega)v$ components and can be presented as $V = \dot{r}u + r\omega$, where rotational velocity in the projectile plane $$\omega = \dot{\varphi}\omega + (\dot{\theta} + \Omega)v = \frac{L}{r^2}.$$

Figure 2:
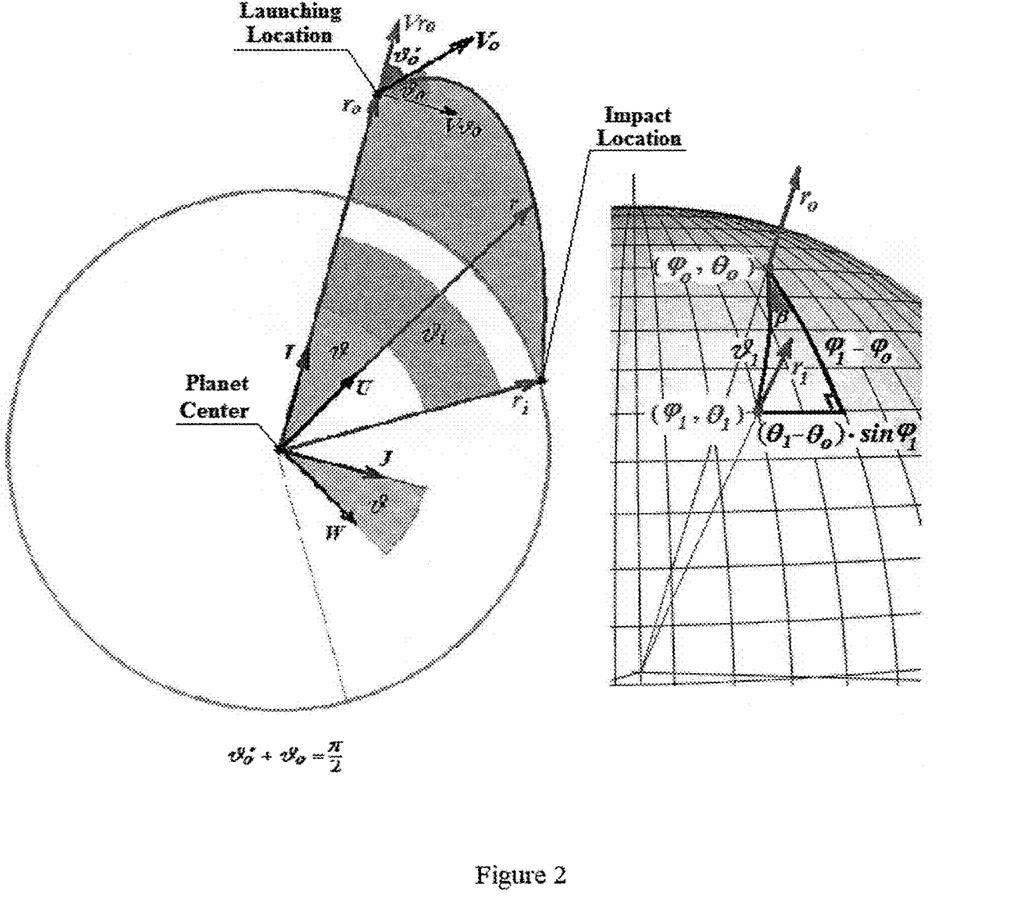
FIG. 2. 2-D solution of a projectile motion in rotating ECEF local coordinates I-J (trace 2-3) coupled to changing longitude and latitude of the spherical triangle centered at the origin.

Magnitude of $\omega$ is defined by rotational angle measured in this plane (FIG. 2):

$$\omega = \frac{d\vartheta}{dt} \quad \text{(Eq. 8)}$$

Magnitude of angular momentum $L^2$ and projectile total energy $-e$ could be defined from initial condition as $$L^2 = r_o^2 \cdot (V_{\varphi_o}^2 + V_{\theta_o}^2 + 2r_o^2\dot{\theta}_o\Omega \cdot \sin^2\varphi_o + r_o^2\Omega^2 \cdot \sin^2\varphi_o) \quad \text{(Eq. 9)}$$

$$e = \gamma\frac{M}{r_o} - \frac{V_{ro}^2}{2} - \frac{L^2}{2r_o^2} \quad \text{(Eq. 10)}$$

Here $V_{ro} = \dot{r}_o = V_o \sin\vartheta_o$; $V_{\varphi_o} = r_o\dot{\varphi}_o = V_o \cos\vartheta_o \cdot \cos(\pm\beta)$; and $V_{\theta_o} = r_o\dot{\theta}_o \sin\varphi_o = V_o \cos\vartheta_o \cdot \sin(\pm\beta)$ are respectively radial, altitudinal and azimuthal components of velocity in inertial (stationary) frame of reference;

$r_o$, $V_o$, and $\vartheta_o$ are launching radial coordinate, velocity and angle correspondingly; $\beta$ is horizontal direction of launch negative for westward and positive for eastward measurement (FIG. 1)

Eq.10 provides with the expression for maximum projectile elevation when its radial velocity is zero:

$$r_{max} = \frac{\gamma M + \sqrt{K}}{2e} \quad \text{(Eq. 11)}$$

where flight constant $K = \gamma^2 M^2 - 2eL^2$

Substitution Eq.10 into Eq.7 reveals $$\frac{dr}{dt} = \frac{1}{r} \cdot \sqrt{-2e \cdot r^2 + 2\gamma M \cdot r - L^2} \quad \text{(Eq. 12)}$$

with solution for flight time t:

$$t = \begin{cases} t_a = \frac{\sqrt{f(r_o)} - \sqrt{f(r)}}{2e} + \frac{\gamma M}{2e\sqrt{2e}}\left(\arcsin\frac{2er - \gamma M}{\sqrt{K}} - \arcsin\frac{2er_o - \gamma M}{\sqrt{K}}\right), r \geq r_o \\ t_{max} = \frac{\sqrt{f(r_o)} - \sqrt{f(r_{max})}}{2e} + \frac{\gamma M}{2e\sqrt{2e}}\left(\arcsin\frac{2er_{max} - \gamma M}{\sqrt{K}} - \arcsin\frac{2er_o - \gamma M}{\sqrt{K}}\right), r = r_{max} \\ t_d = t_{max} + \frac{\sqrt{f(r)} - \sqrt{f(r_{max})}}{2e} + \frac{\gamma M}{2e\sqrt{2e}}\left(\arcsin\frac{2er_{max} - \gamma M}{\sqrt{K}} - \arcsin\frac{2er - \gamma M}{\sqrt{K}}\right), r < r_{max} \end{cases} \quad \text{(Eq. 13)}$$

where $f(r_o) = -2er_o^2 + 2\gamma Mr_o - L^2$;

$f(r_{max}) = -2er_{max}^2 + 2\gamma Mr_{max} - L^2$;

$f(r) = -2er^2 + 2\gamma Mr - L^2$;

Substitution of Eq.2 solution:

$(\Omega + \dot{\theta}) \cdot r^2 \cdot \sin^2\varphi = L_\theta = \text{const}$ into Eq.5 leads to $$\sin\varphi \, d\varphi = \frac{\sqrt{L^2\sin^2\varphi - L_\theta^2}}{r^2 \cdot \dot{r}} dr \quad \text{(Eq. 14)}$$

providing with altitudinal coordinate $\varphi$:

$$\varphi = \begin{cases} \varphi_a = \varphi_o + \frac{\cos\beta}{|\cos\beta|}\arcsin[C \cdot R_a], r \geq r_o \\ \varphi_{max} = \varphi_o + \frac{\cos\beta}{|\cos\beta|}\arcsin[C \cdot R_{max}], r = r_{max} \\ \varphi_d = \varphi_{max} + \frac{\cos\beta}{|\cos\beta|}\arcsin[C \cdot R_d], r < r_{max} \end{cases} \quad \text{(Eq. 15)}$$

where $$C = \sqrt{\frac{\dot{\varphi}_o^2 + (\dot{\theta}_o + \Omega)^2 \sin^2\varphi_o \cos^2\varphi_o}{\dot{\varphi}_o^2 + (\dot{\theta}_o + \Omega)^2 \sin^2\varphi_o}} = \sqrt{\frac{r_o^2 \cdot V_{\varphi_o}^2 \cdot \sin^2\varphi_o + L^2 \cdot \cos^2\varphi_o}{L^2}},$$

function $$R = \begin{cases} R_a = L \cdot \dfrac{(\gamma Mr - L^2)\sqrt{f(r_o)} - (\gamma Mr_o - L^2)f\sqrt{(r)}}{K \cdot r \cdot r_o}, & r \geq r_o \\ R_{max} = L \cdot \dfrac{(\gamma Mr_{max} - L^2)\sqrt{f(r_o)} - (\gamma Mr_o - L_2)\sqrt{f(r_{max})}}{K \cdot r_o \cdot r_{max}}, & r = r_{max} \\ R_d = L \cdot \dfrac{(\gamma Mr_{max} - L^2)\sqrt{f(r)} - (\gamma Mr - L^2)\sqrt{f(r_{max})}}{K \cdot r \cdot r_o}, & r < r_{max} \end{cases} \quad \text{(Eq. 16)}$$

and coefficient $$\frac{\cos\beta}{|\cos\beta|}$$

indicates altitudinal coordinate increase or decrease depending on the launching direction $\beta$.

Substituting expression for time increment dt expressed in terms of Eq.12 into Eq.8 obtain $$d\vartheta = L \cdot \frac{dr}{r \cdot \sqrt{-2e \cdot r^2 + 2\gamma M \cdot r - L^2}} \quad \text{(Eq. 17)}$$

with solution for rotational angle $\vartheta$:

$$\vartheta = \arcsin[R] = \begin{cases} \vartheta_a = \arcsin[R_a], & r \geq r_o \\ \vartheta_{max} = \arcsin[R_{max}], & r = r_{max} \\ \vartheta_d = \vartheta_{max} + \arcsin[R_d], & r < r_{max} \end{cases} \quad \text{(Eq. 18)}$$

Employment of the latest equation (Eq.8) together with Eqs.6 and 15 reveals:

$$\frac{d\varphi}{(d\theta + \Omega dt)\sin\varphi} = \frac{C}{\sqrt{1-C^2}} \cdot \sqrt{1-R^2} \quad \text{(Eq. 19)}$$

with the solution for azimuthal coordinate $\theta$:

$$\theta = \begin{cases} \theta_a = \theta_o + \dfrac{\sin 2\beta}{|\sin 2\beta|} \cdot \dfrac{\sqrt{1-C^2}}{C\sqrt{1-R_a^2}} \ln\left|\dfrac{\tan(\varphi_a/2)}{\tan(\varphi_o/2)}\right| - \Omega \cdot t_a, & r \geq r_o \\ \theta_{max} = \theta_o + \dfrac{\sin 2\beta}{|\sin 2\beta|} \cdot \dfrac{\sqrt{1-C^2}}{C\sqrt{1-R_{max}^2}} \ln\dfrac{|\tan(\varphi_{max}/2)|}{|\tan(\varphi_o/2)|} - \Omega \cdot t_{max}, & r = r_{max} \\ \theta_d = \theta_{max} + \dfrac{\sin 2\beta}{|\sin 2\beta|} \cdot \dfrac{\sqrt{1-C^2}}{C\sqrt{1-R_d^2}} \ln\dfrac{|\tan(\varphi_d/2)|}{|\tan(\varphi_{max}/2)|} - \Omega \cdot (t_d - t_{max}), & r < r_{max} \end{cases} \quad \text{(Eq. 20)}$$

where coefficient $$\frac{\sin 2\beta}{|\sin 2\beta|}$$

takes into account azimuthal coordinate increase or decrease depending on the launching direction $\beta$.

Eqs.13, 15, 16, and 20 is actually the parametric system of equations defining a projectile trajectory in non-inertial frame of reference and require for their completion equation of hodograph, i.e. velocity vs. time dependence.

Due to energy conservation (Eq.8) projectile speed at any moment of time can be defined as $$V = \sqrt{V_o^2 \cdot \sin^2\vartheta_o + \frac{L^2}{r_o^2} - \frac{2\gamma M}{r_o r}(r - r_o)} \quad \text{(Eq. 21)}$$

Introduction of projectile ascending speed $V_a$, speed at maximum elevation $V_{min}$, and descending speed $V_d$ breaks Eq.21 into three parts logically fitting trajectory analysis:

$$V = \begin{cases} V_a = \sqrt{V_o^2 \sin^2\vartheta_o + \dfrac{L^2}{r_o^2} - \dfrac{2\gamma M}{r_o r}(r - r_o)}, & r \geq r_o \\ V_{min} = \sqrt{V_o^2 \sin^2\vartheta_o + \dfrac{L^2}{r_o^2} - \dfrac{2\gamma M}{r_o r_{max}}(r_{max} - r_o)}, & r = r_{max} \\ V_d = \sqrt{V_{min}^2 + \dfrac{2\gamma M}{r_{max} r}(r_{max} - r)}, & r < r_{max} \end{cases} \quad \text{(Eq. 22)}$$

Derived above equations of projectile motion in three-dimensional non-inertial frame of reference indicate that, due to the presence of additional component of angular momentum, projectile coordinates are going to be shifted in westward direction "twisting" the trajectory plane.

The other obvious reasons for coordinates shift is possible projectile rotation, atmospheric conditions, drag force etc. which are actually taken into account by a radar.

Actually, any point of projectile trajectory can be treated as the "launching" (with script 0) one. Next to it position (with script 1) traced by a radar is so close to the initial that both projectile positions can be assumed to be in flat two dimensional plane. Thus, these two radar records can be treated as a projectile moving in inertial frame of reference ($\Omega$=0) under existing deflecting its flight conditions.

Equation of projectile dynamics according to Eq.1 in this case becomes $$-\gamma \frac{M}{r^3} r = \frac{d\vec{V}}{dt} \quad \text{(Eq. 23)}$$

Introduction (FIG. 2) of radial unit vector U and its derivatives:

$$U = \cos \vartheta \cdot I + \sin \vartheta \cdot J$$

$$W = \frac{dU}{d\vartheta} = -\sin \vartheta \cdot I + \cos \vartheta \cdot J$$

$$\frac{dW}{d\vartheta} = -\cos \vartheta \cdot I - \sin \vartheta \cdot J = -U$$

and taking into consideration that r=r·U;

$$V = \frac{dr}{dt} = \dot{r} \cdot U + r \cdot \dot{\vartheta} \cdot W;$$

and $L = r^2 \dot{\vartheta} = r_o \cdot V_o \cdot \cos \vartheta_o$ provides with the solution:

$$r = \frac{L^2}{\gamma M \left[1 - \cos \vartheta + \frac{L}{\gamma M} V_o \cos(\vartheta_o + \vartheta)\right]} \quad \text{(Eq. 24)}$$

which, in turn, reveals the following expressions for two consequent projectile positions:

$$r_o = \frac{L}{V_o \cdot \cos \vartheta_o} \text{ and }$$

$$r_1 = \frac{L^2}{\gamma M \left[1 - \cos \vartheta_1 + \frac{L}{\gamma M} V_o \cos(\vartheta_o + \vartheta_1)\right]},$$

where, $\cos \vartheta_1 = \cos(\varphi_1 - \varphi_o) \cdot \cos [(\theta_1 - \theta_o) \cdot \sin \varphi_1]$ what is the cosine rule of spherical right triangle centered at the origin of spherical coordinates (FIG. 2).

If the set of longitude/latitude radar coordinates is Lo0/La0 and Lo1/La1 then altitudinal and azimuthal angles are defined as follows: $\theta_0$=Lo0; $\theta_1$=Lo1; $\varphi_o$=90°−La0; $\varphi_1$=90°−La1 Application of energy conservation to radar provided positions:

$$\frac{V_o^2 \cdot \sin^2 \vartheta_o}{2} + \frac{L^2}{2r_o^2} - \frac{\gamma M}{r_o} = \frac{V_1^2 \cdot \sin^2(\vartheta_o + \vartheta_1)}{2} + \frac{L^2}{2r_1^2} - \frac{\gamma M}{r_1}$$

reveals the solution for initial (launching) angle $$\vartheta_o = \arctan \left[\frac{r_1 V_1 \cos \vartheta_1 - r_o V_o}{r_1 V_1 \sqrt{1 - \cos^2 \vartheta_1}}\right] \quad \text{(Eq. 25)}$$

positive for ascending projectile and negative for descending.

Direction of "launch" can be defined from the sine rule of spherical right triangle (FIG. 2) as $$\beta = \arcsin \left\{\frac{\sin[(\theta_1 - \theta_o) \cdot \sin \varphi_1]}{\sqrt{1 - \cos^2 \vartheta_1}}\right\} \quad \text{(Eq. 26)}$$

Establishing "launching" parameters of a projectile flight from two consequent radar measurements allows to further predict projectile real behavior ahead of time.

Developed technique creates the basis of device operation (FIG. 3) in two modes using either manual or provided by a radar input, and both allowing predict exact trajectory of a projectile and its speed at impact.

TABLE

Figure 3:
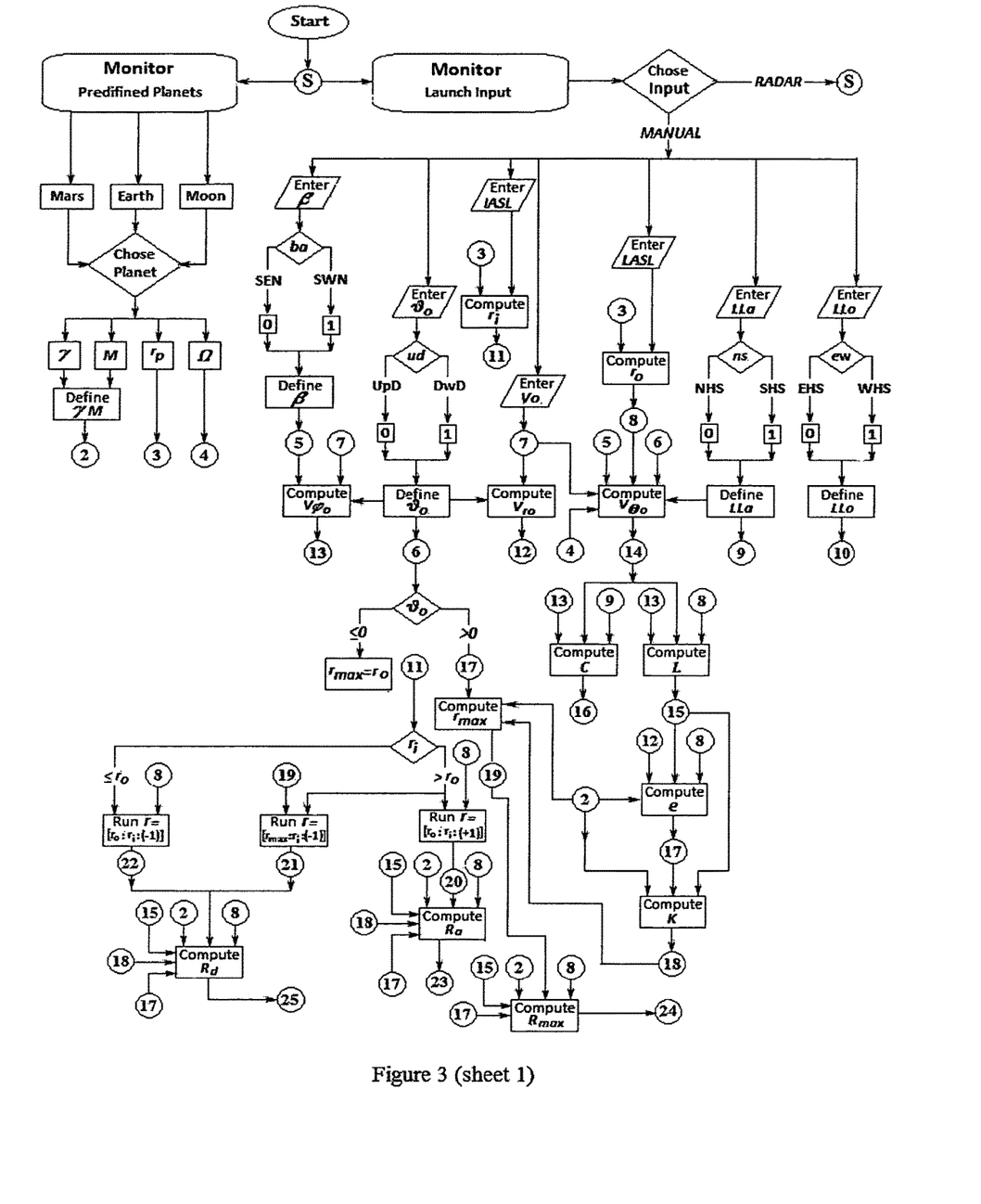
FIG. 3. Flow Chart Diagram for precise projectile flight prediction using either manual (sheet 1) or radar provided (sheet 2) input and common output (sheet 3).

| Flow Chart Diagram for Precise Projectile Flight Prediction: |
| --- |

| Predefined Data for: |
| --- |
| Planet Earth |

| Gravitational constant γ in preferred system of units $\gamma = 6.674 \times 10^{-11} \frac{m^3}{kg * s^2}$ |
| --- |
| Planet radius $r_P$ measured in the same system of units $r_P = 6.37 \times 10^6$ m |
| Planet mass M measured in the same system of units M = 5.972 × $10^{24}$ kg |
| Planet rotational speed Ω measured in radians per unit time Ω = 7.29 × $10^{-5}$ $s^{-1}$ |
| Planet Moon |

| Gravitational constant γ in preferred system of units $\gamma = 6.674 \times 10^{-11} \frac{m^3}{kg * s^2}$ |
| --- |
| Planet radius $r_P$ measured in the same system of units $r_P = 1.74 \times 10^6$ m |
| Planet mass M measured in the same system of units M = 7.35 × $10^{22}$ kg |
| Planet rotational speed Ω measured in radians per unit time Ω = 2.67 × $10^{-6}$ $s^{-1}$ |

TABLE-continued

Flow Chart Diagram for Precise Projectile Flight Prediction:

Planet Mars

Gravitational constant γ in preferred system of units
$$\gamma = 6.674 \times 10^{-11} \frac{m^3}{kg * s^2}$$

Planet radius $r_p$ measured in the same system of units $r_p = 3.39 \times 10^6$ m
Planet mass M measured in the same system of units $M = 6.39 \times 10^{23}$ kg
Planet rotational speed Ω measured in radians per unit time $\Omega = 7.09 \times 10^{-5}$ s$^{-1}$ Planet choice provides with:

2: Value $\gamma \cdot M$
3: Value $r_p$
4: Value Ω; this vector is always pointing from South Pole - to - North Pole Manual Input:

5: Enter launching direction angle β (in °) positive when measured on horizontal launching platform counterclockwise from direction of south-to-east-to-north (SEN) and negative for south-to-west-to-north (SWN) direction thus, defined as $\beta(1 - 2 \cdot ba)$, where $ba = \begin{cases} 0 \text{ for SEN} \\ 1 \text{ for SWN} \end{cases}$ 6: Enter launching angle $\vartheta_o$ (in °) positive when measured in upward (counterclockwise) direction (UpD) from launching horizontal platform and negative for downward direction (DwD) hence, defined as $\vartheta_o (1 - 2 \cdot ud)$, where $ud = \begin{cases} 0 \text{ for UpD} \\ 1 \text{ for DwD} \end{cases}$ 7: Enter launching speed $V_o$ (in m/sec)
8: Enter Launching Altitude above planet Surface Level LASL (in meters) positive when above and negative when under surface level thus, radial launching coordinate $r_o$ is computed as $r_o = r_p + LASL$
9: Enter Launching Latitude LLa (in °) positive for northern hemisphere (NHS) and negative for southern (SHS) thus, defined as $LLa(1 - 2 \cdot ns)$, where $ns = \begin{cases} 0 \text{ for NHS} \\ 1 \text{ for SHS} \end{cases}$ 10: Enter Launching Longitude LLo (in °) positive in eastern hemisphere (EHS) and negative in western (WHS) hence, defined as $LLo(1 - 2 \cdot ew)$, where $ew = \begin{cases} 0 \text{ for EHS} \\ 1 \text{ for WHS} \end{cases}$ 11: Enter Impact Altitude above planet Surface Level IASL (in meters) positive when above and negative when below surface level hence, radial impact coordinate $r_i$ is computed as $r_i = r_p + IASL$ Flight Constants Computation:

12: Initial Radial Speed $V_{ro} = V_o \sin(\vartheta_o)$
13: Initial Altitudinal Speed $V_{\varphi o} = V_o \cos(\vartheta_o) \cdot \cos(\beta)$
14: Initial Azimuthal Speed $V_{\theta o} = V_o \cos(\vartheta_o) \cdot \sin(\beta) + r_o \cdot \Omega \cdot \cos(LLa)$
15: Angular momentum $L = r_o \cdot \sqrt{V_{\varphi o}^2 + V_{\theta o}^2}$ 16: Altitudinal coefficient
$$C = \sqrt{\frac{V_{\varphi o}^2 + V_{\theta o}^2 \cdot \sin^2(LLa)}{V_{\varphi o}^2 + V_{\theta o}^2}}$$

17: Total Energy Magnitude
$$e = \gamma \frac{M}{r_o} - \frac{V_{ro}^2}{2} - \frac{L^2}{2r_o^2}$$

18: Flight Constant $K = \gamma^2 M^2 - 2eL^2$

19: Maximum Elevation
$$r_{max} = \begin{cases} \dfrac{\gamma M + \sqrt{K}}{2e} & \text{if } \vartheta_o > 0 \\ r_o & \text{if } \vartheta_o \leq 0 \end{cases}$$

Trajectory Parameters for Upward Launch $\vartheta_o > 0$:

Ascending leg
20: Radial position $r_a$ is defined by running numbers from $r_o$ to $r_i$ through default increment +1m $r_a = r_o$: $r_i$: (+1m) computing:

TABLE-continued

Flow Chart Diagram for Precise Projectile Flight Prediction:

23: Ascending R-function
$$R_a = L \cdot \frac{(\gamma M r_a - L^2)\sqrt{-2er_o^2 + 2\gamma M r_o - L^2} - (\gamma M r_o - L^2)\sqrt{-2er_a^2 + 2\gamma M r_a - L^2}}{r_a \cdot r_o \cdot K}$$

28: Ascending time
$$t_a = \frac{\sqrt{-2er_o^2 + 2\gamma M r_o - L^2} - \sqrt{-2er_a^2 + 2\gamma M r_a - L^2}}{2e} + \frac{\gamma M}{2e\sqrt{2e}}\left(\arcsin\frac{2er_a - \gamma M}{\sqrt{K}} - \arcsin\frac{2er_o - \gamma M}{\sqrt{K}}\right)$$

33: Ascending Latitude
$$ALa = LLa - \frac{\cos\beta}{|\cos\beta|} \cdot \frac{180°}{\pi} \cdot \arcsin[C \cdot R_a]$$

34: Ascending Longitude
$$ALo = LLo + \frac{\sin 2\beta}{|\sin 2\beta|} \cdot \frac{180°}{\pi} \cdot \frac{\sqrt{1-C^2}}{C \cdot \sqrt{1-R_a^2}} \ln\frac{\left|\tan\left(45° - \frac{ALa}{2}\right)\right|}{\left|\tan\left(45° - \frac{LLa}{2}\right)\right|} - \Omega \cdot t_a$$

37: Ascending Speed
$$V_a = \sqrt{V_o^2 \cdot \sin^2\vartheta_o + \frac{L^2}{r_o^2} - \frac{2\gamma M}{r_a \cdot r_o} \cdot (r_a - r_o)}$$

Maximum Elevation

24: R-Function
$$R_{max} = L \cdot \frac{\sqrt{-2er_o^2 + 2\gamma M r_o - L^2}}{r_o \cdot (2er_{max} - \gamma M)}$$

29: Time to maximum elevation
$$t_{max} = \frac{\sqrt{-2er_o^2 + 2\gamma M r_o - L^2}}{2e} + \frac{\gamma M}{2e\sqrt{2e}}\left(\frac{\pi}{2} - \arcsin\frac{2er_o - \gamma M}{\sqrt{K}}\right)$$

31: Maximum elevation Latitude
$$MLa = LLa - \frac{\cos\beta}{|\cos\beta|} \cdot \frac{180°}{\pi} \cdot \arcsin[C \cdot R_{max}]$$

32: Maximum elevation Longitude
$$MLo = LLo + \frac{\sin 2\beta}{|\sin 2\beta|} \cdot \frac{180°}{\pi} \cdot \frac{\sqrt{1-C^2}}{C \cdot \sqrt{1-R_{max}^2}} \ln\frac{\left|\tan\left(45° - \frac{MLa}{2}\right)\right|}{\left|\tan\left(45° - \frac{LLa}{2}\right)\right|} - \Omega \cdot t_{max}$$

38: Speed at maximum elevation
$$V_{min} = \sqrt{V_o^2 \cdot \sin^2\vartheta_o + \frac{L^2}{r_o^2} - \frac{2\gamma M}{r_{max} \cdot r_o} \cdot (r_{max} - r_o)}$$

Descending Leg
21: Radial position $r_d$ is defined by running numbers from $r_{max}$ to $r_i$ through default increment $-1m$ $r_d = r_{max}$: $r_i$: ($-1m$) computing:

25: R-Function
$$R_d = L \cdot \frac{(\gamma M r_{max} - L^2)\sqrt{-2er_d^2 + 2\gamma M r_d - L^2} - (\gamma M r_d - L^2)\sqrt{-2er_{max}^2 + 2\gamma M r_{max} - L^2}}{r_{max} \cdot r_d \cdot K}$$

30: Descending time
$$t_d = \frac{\sqrt{-2er_d^2 + 2\gamma M r_d - L^2} - \sqrt{-2er_{max}^2 + 2\gamma M r_{max} - L^2}}{2e} + \frac{\gamma M}{2e\sqrt{2e}}\left(\arcsin\frac{2er_{max} - \gamma M}{\sqrt{K}} - \arcsin\frac{2er_d - \gamma M}{\sqrt{K}}\right)$$

35: Descending Latitude
$$DLa = MLa - \frac{\cos\beta}{|\cos\beta|} \cdot \frac{180°}{\pi} \cdot \arcsin[C \cdot R_d]$$

36: Descending Longitude
$$DLo = MLo + \frac{\sin 2\beta}{|\sin 2\beta|} \cdot \frac{180°}{\pi} \cdot \frac{\sqrt{1-C^2}}{C \cdot \sqrt{1-R_d^2}} \ln\frac{\left|\tan\left(45° - \frac{DLa}{2}\right)\right|}{\left|\tan\left(45° - \frac{MLa}{2}\right)\right|} - \Omega \cdot t_d$$

39: Descending Speed
$$V_d = \sqrt{V_{min}^2 + \frac{2\gamma M}{r_d \cdot r_{max}} \cdot (r_{max} - r_d)}$$

TABLE-continued

Flow Chart Diagram for Precise Projectile Flight Prediction:

Trajectory Parameters for Downward Launch $\vartheta_o < 0$:

22: Radial position $r_d$ is defined by running numbers from $r_o$ to $r_i$ through default increment
$-1m$ $r_d = r_o$: $r_i$: $(-1m)$ computing:

25: R-Function
$$R_d = L \cdot \frac{(\gamma Mr_o - L^2)\sqrt{-2er_d^2 + 2\gamma Mr_d - L^2} - (\gamma Mr_d - L^2)\sqrt{-2er_o^2 + 2\gamma Mr_o - L^2}}{r_o \cdot r_d \cdot K}$$

30: Descending time
$$t_d = \frac{\sqrt{-2er_d^2 + 2\gamma Mr_d - L^2} - \sqrt{-2er_o^2 + 2\gamma Mr_o - L^2}}{2e} + \frac{\gamma M}{2e\sqrt{2e}}\left(\arcsin\frac{2er_o - \gamma M}{\sqrt{K}} - \arcsin\frac{2er_d - \gamma M}{\sqrt{K}}\right)$$

35: Descending Latitude
$$DLa = MLa - \frac{\cos\beta}{|\cos\beta|} \cdot \frac{180°}{\pi} \cdot \arcsin[C \cdot R_d]$$

36: Descending Longitude
$$DLo = MLo + \frac{\sin 2\beta}{|\sin 2\beta|} \cdot \frac{180°}{\pi} \cdot \frac{\sqrt{1-C^2}}{C \cdot \sqrt{1-R_d^2}} \ln\frac{\left|\tan\left(45° - \frac{DLa}{2}\right)\right|}{\left|\tan\left(45° - \frac{MLa}{2}\right)\right|} - \Omega \cdot t_d$$

40: Descending Speed
$$V_d = \sqrt{V_o^2 + \frac{2\gamma M}{r_d \cdot r_o} \cdot (r_o - r_d)}$$

Print trajectory radial, longitudinal and latitudinal coordinates together with projectile velocities at flight times
Plot 3-D trajectory marking time and speed at desired locations
Radar Input:

Radar Input Module (see reference for ECEF coordinate conversion: I-295 to I-312, DTFA01-88-c-00042, CDRL-EN25, Change 2, Volume I, Sep. 06, 1991):

7: Enter "launching" speed $V_o$ (in m/sec)
Enter next to "launching" point speed $V_1$ (in m/sec)

8: Enter "Launching" Altitude above planet surface LAo (in meters) positive when above and negative when under surface level thus, radial launching coordinate $r_o$ is computed as
$r_o = r_p + LAo$
Enter next to "Launching" point Altitude above planet surface $LA_1$ (in meters) positive when above and negative when under surface level thus, radial launching coordinate $r_1$ is computed as $r_1 = r_p + LA_1$ 9: Enter "launching" Latitude La0 (in °) positive for northern hemisphere (NETS) and negative for southern (SHS) thus, defined as LLa = La0(1 − 2 · ns), where $$ns = \begin{cases} 0 \text{ for NHS} \\ 1 \text{ for SHS} \end{cases}$$

10: Enter "launching" Longitude Lo0 (in °) positive in eastern hemisphere (EHS) and negative in western (WHS) hence, defined as LLo = Lo0(1 − 2 · ew), where $$ew = \begin{cases} 0 \text{ for EHS} \\ 1 \text{ for WHS} \end{cases}$$

26: Enter next to "launching" point Latitude La1 (in °) positive for northern hemisphere (NHS) and negative for southern (SHS) thus, defined as La1(1 − 2 · ns), where $$ns = \begin{cases} 0 \text{ for NHS} \\ 1 \text{ for SHS} \end{cases}$$

27: Enter next to "launching" point Longitude Lo1 (in °) positive in eastern hemisphere (EHS) and negative in western (WHS) hence, defined as Lo1(1 − 2 · ew), where $$ew = \begin{cases} 0 \text{ for EHS} \\ 1 \text{ for WHS} \end{cases}$$

11: Enter Impact Altitude above planet surface IA (in meters) positive when above and negative when below surface level hence, radial impact coordinate $r_i$ is computed as
$r_i = r_p + IA$ TABLE-continued Flow Chart Diagram for Precise Projectile Flight Prediction:

Flight Initials and Constants Computation:

5: "Launching" direction angle
$$\beta = \frac{180°}{\pi} \arcsin\left[\frac{\sin[(Lo1 - LLo)\cdot\cos(La1)]}{\sqrt{1 - \cos^2(LLa - La1)\cdot\cos^2[(Lo1 - LLo)\cdot\cos(La1)]}}\right]$$

6: "Launching" angle
$$\vartheta_o = \frac{180°}{\pi} \arcsin\left[\frac{r_1 V_1 \cos(LLa - La1)\cdot\cos[(Lo1 - LLo)\cdot\cos(La1)] - r_o V_o}{r_1 V_1 \sqrt{1 - \cos^2(LLa - La1)\cdot\cos^2[(Lo1 - LLo)\cdot\cos(La1)]}}\right]$$

12: Initial Radial Speed $V_{ro} = V_o \sin(\vartheta_o)$
13: Initial Altitudinal Speed $V_{\varphi o} = V_o \cos(\vartheta_o) \cdot \cos(\beta)$
14: Initial Azimuthal Speed $V_{\theta o} = V_o \cos(\vartheta_o) \cdot \sin(\beta) + r_o \cdot \Omega \cdot \cos(La0)$
15: Angular momentum $L = r_o \cdot \sqrt{V_{\varphi o}^2 + V_{\theta o}^2}$ 16: Altitudinal coefficient
$$C = \sqrt{\frac{V_{\varphi o}^2 + \cdot V_{\theta o}^2 \cdot \sin^2(La0)}{V_{\varphi o}^2 + \cdot V_{\theta o}^2}}$$

17: Total Energy Magnitude
$$e = \gamma \frac{M}{r_o} - \frac{V_{ro}^2}{2} - \frac{L^2}{2r_o^2}$$

18: Flight Constant $K = \gamma^2 M^2 - 2eL^2$

19: Maximum Elevation
$$r_{max} = \begin{cases} \frac{\gamma M + \sqrt{K}}{2e} & \text{if } \vartheta_o > 0 \\ r_o & \text{if } \vartheta_o \leq 0 \end{cases}$$

Then continue with switch 20

DISCUSSION

Features of proposed device include:

Precise estimate of impact coordinates and speed from the input of launching position, velocity and direction. The chart below shows that, while flight times are very close for inertial and non-inertial frames of reference, mismatch distance between computed landing points in these frames for various identical initial conditions is quite substantial even for a ground launch with pretty moderate velocity.

| Launching Altitude, m | Launching Speed, m/s | Launching Angle $\vartheta_o$° | Launching Direction $\beta$° | Flight Time in sec. for $\Omega$ = 0 sec$^{-1}$ | Flight Time in sec. for $\Omega$ = 7.292 * 10$^{-5}$ sec$^{-1}$ | Mismatch Distance, m |
|---|---|---|---|---|---|---|
| 30,000 | 1,000 | 45 | −30 | 181.65 | 181.38 | 436.6 |
| 30,000 | 1,000 | 45 | 0 | 181.65 | 181.79 | 1,136.4 |
| 30,000 | 100 | 45 | −30 | 86.07 | 86.10 | 502.4 |
| 10,000 | 1,000 | 45 | −30 | 73.19 | 73.06 | 381.7 |
| 10,000 | 100 | 45 | −30 | 52.98 | 53.00 | 308.6 |
| 10,000 | 10 | 45 | −30 | 45.91 | 45.93 | 316.9 |
| 1,000 | 10 | 45 | −30 | 15.01 | 15.02 | 103.4 |
| 0 | 100 | 45 | −30 | 14.40 | 14.41 | 83.7 |
| 0 | 10 | 45 | −30 | 1.44 | 1.44 | 9.99 |

Precise estimate of projectile trajectory and its hodograph. Conversion of spherical coordinates into geographical ones allows establishing presented in the Table computational method for direct prediction of exact projectile path and real speed in rotating reference frame. Having been based on derived equations proposed device takes into consideration not only Coriolis and centrifugal forces but also the change of gravity due to different projectile altitudes. All requirements for input angles are listed in the Table too.

Radar data input by processing two initial consequent radar readings leading to predicting the whole true trajectory and projectile speed under actual conditions of flight including drag force. Actually, this provides radar with a new, currently not available function significantly improving radar performance.

Efficient computation. Proposed device is based on method which does not require any iterations. It is fast and exact as considers all possible factors resulting in projectile flight.

Effectiveness on any planet with or without radar support.

While illustrative embodiment of the invention has been shown and described, numerous variations and alternate embodiments, including eliminating one or more of the steps or elements presented herein, will occur to those skilled in the art. Such variations and alternate embodiments are contemplated and can be made without departing from the spirit and scope of the invention as mentioned in the appended claims.

The invention claimed is:

1. A universal method of exact analytical solution of an unguided and unpowered projectile flight on a chosen rotating planet comprising the following steps:

inputting of two consequently detected projectile initial (launching L) and next to it radial positions $r_o$ and $r_1$, latitudes $LLa$ and $La_1$, longitudes $LLo$ and $Lo_1$, velocities $V_o$ and $V_1$ for determining launching angle $$\vartheta_o = \arctan\left[\frac{r_1 V_1 \cdot \cos(La_1 - LLa) \cdot \cos(Lo_1 - LLo) \cdot \sin(La_1) - r_o V_o}{r_1 V_1 \sqrt{1 - \cos^2(La_1 - LLa) \cdot \cos^2(Lo_1 - LLo) \cdot \sin^2(La_1)}}\right]$$

and bearing angle $$\beta = \arcsin\left\{\frac{\sin[(Lo_1 - LLo) \cdot \sin(La_1)]}{\sqrt{1 - \cos^2(La_1 - LLa) \cdot \cos^2(Lo_1 - LLo) \cdot \sin^2(La_1)}}\right\};$$

processing input by defining a projectile flight (in gravitational field of a chosen planet of mass M rotating with angular velocity $\Omega$) constants initial radial speed $V_{ro} = V_o \sin(\vartheta_o)$,
initial altitudinal speed $V_{\varphi o} = V_o \cos(\vartheta_o) \cdot \cos(\beta)$,
initial azimuthal speed $V_{\theta o} = V_o \cos(\vartheta_o) \cdot \sin(\beta) + r_o \cdot \Omega \cdot \cos(LLa)$,
angular momentum $$L = r_o \cdot \sqrt{V_{\varphi o}^2 + V_{\theta o}^2},$$

altitudinal coefficient $$C = \sqrt{\frac{V_{\varphi o}^2 + V_{\theta o}^2 \cdot \sin^2(LLa)}{V_{\varphi o}^2 + V_{\theta o}^2}},$$

magnitude of total energy $$e = \gamma\frac{M}{r_o} - \frac{V_{ro}^2}{2} - \frac{L^2}{2r_o^2}$$

(where $\gamma$ is gravitational constant),
flight constant $K = \gamma^2 M^2 - 2eL^2$,
maximum elevation $$r_{max} = \begin{cases} \frac{\gamma M + \sqrt{K}}{2e} & \text{if } \vartheta_o > 0 \\ r_o & \text{if } \vartheta_o \leq 0 \end{cases};$$

estimating exact projectile flight parameters
for launching angle $\vartheta_o > 0$:

ascending radial coordinate $r_a = r_o : r_i : (+1\text{m})$,
ascending R-function $$R_a = L \cdot \frac{(\gamma M r_a - L^2)\sqrt{-2er_o^2 + 2\gamma M r_o - L^2} - (\gamma M r_o - L^2)\sqrt{-2er_a^2 + 2\gamma M r_a - L^2}}{r_a \cdot r_o \cdot K},$$

ascending time $$t_a = \frac{\sqrt{-2er_o^2 + 2\gamma M r_o - L^2} - \sqrt{-2er_a^2 + 2\gamma M r_a - L^2}}{2e} + \frac{\gamma M}{2e\sqrt{2e}}\left(\arcsin\frac{2er_a - \gamma M}{\sqrt{K}} - \arcsin\frac{2er_o - \gamma M}{\sqrt{K}}\right),$$

ascending latitude $$ALa = LLa - \frac{\cos\beta}{|\cos\beta|} \cdot \frac{180°}{\pi} \cdot \arcsin[C \cdot R_a],$$

ascending longitude $$ALo = LLo + \frac{\sin 2\beta}{|\sin 2\beta|} \cdot \frac{180°}{\pi} \cdot \frac{\sqrt{1 - C^2}}{C \cdot \sqrt{1 - R_a^2}} \ln\frac{\left|\tan\left(45° - \frac{ALa}{2}\right)\right|}{\left|\tan\left(45° - \frac{LLa}{2}\right)\right|} - \Omega \cdot t_a,$$

ascending speed $$V_a = \sqrt{V_o^2 \cdot \sin^2\vartheta_o + \frac{L^2}{r_o^2} - \frac{2\gamma M}{r_a \cdot r_o} \cdot (r_a - r_o)},$$

R-function at maximum elevation $$R_{max} = L \cdot \frac{\sqrt{-2er_o^2 + 2\gamma M r_o - L^2}}{r_o \cdot (2er_{max} - \gamma M)},$$

time to maximum elevation $$t_{max} = \frac{\sqrt{-2er_o^2 + 2\gamma M r_o - L^2}}{2e} + \frac{\gamma M}{2e\sqrt{2e}}\left(\frac{\pi}{2} - \arcsin\frac{2er_o - \gamma M}{\sqrt{K}}\right),$$

maximum elevation latitude $$MLa = LLa - \frac{\cos\beta}{|\cos\beta|} \cdot \frac{180°}{\pi} \cdot \arcsin[C \cdot R_{max}],$$

longitude $$MLo = LLo + \frac{\sin 2\beta}{|\sin 2\beta|} \cdot \frac{180°}{\pi} \cdot \frac{\sqrt{1-C^2}}{C \cdot \sqrt{1-R_{max}^2}} \ln \frac{\left|\tan\left(45° - \frac{MLa}{2}\right)\right|}{\left|\tan\left(45° - \frac{LLa}{2}\right)\right|} - \Omega \cdot t_{max},$$

speed at maximum elevation $$V_{min} = \sqrt{V_o^2 \cdot \sin^2 \vartheta_o + \frac{L^2}{r_o^2} - \frac{2\gamma M}{r_{max} \cdot r_o} \cdot (r_{max} - r_o)},$$

descending radial coordinate $r_d = r_{max}:r_i:(-1m)$,
descending R-function $$R_d = L \cdot \frac{(\gamma M r_d - L^2)\sqrt{-2er_d^2 + 2\gamma M r_d - L^2} -}{(\gamma M r_d - L^2)\sqrt{-2er_{max}^2 + 2\gamma M r_{max} - L^2}}{r_{max} \cdot r_d \cdot K},$$

descending time $$t_d = \frac{\sqrt{-2er_d^2 + 2\gamma M r_d - L^2} - \sqrt{-2er_{max}^2 + 2\gamma M r_{max} - L^2}}{2e} +$$

$$\frac{\gamma M}{2e\sqrt{2e}}\left(\arcsin\frac{2er_{max} - \gamma M}{\sqrt{K}} - \arcsin\frac{2er_d - \gamma M}{\sqrt{K}}\right),$$

descending latitude $$DLa = MLa - \frac{\cos\beta}{|\cos\beta|} \cdot \frac{180°}{\pi} \cdot \arcsin(C \cdot R_d),$$

descending longitude $$DLo = MLo + \frac{\sin 2\beta}{|\sin 2\beta|} \cdot \frac{180°}{\pi} \cdot \frac{\sqrt{1-C^2}}{C \cdot \sqrt{1-R_d^2}} \ln \frac{\left|\tan\left(45° - \frac{DLa}{2}\right)\right|}{\left|\tan\left(45° - \frac{MLa}{2}\right)\right|} - \Omega \cdot t_d,$$

descending speed $$V_d = \sqrt{V_{min}^2 + \frac{2\gamma M}{r_d \cdot r_{max}} \cdot (r_{max} - r_d)};$$

launching angle $\vartheta_o \le 0$:
descending radial coordinate $r_d = R_o:r_i:(-1m)$,
descending R-function $$R_d = L \cdot \frac{(\gamma M r_o - L^2)\sqrt{-2er_d^2 + 2\gamma M r_d - L^2} -}{(\gamma M r_d - L^2)\sqrt{-2er_o^2 + 2\gamma M r_o - L^2}}{r_o \cdot r_d \cdot K},$$

descending time $$t_d = \frac{\sqrt{-2er_d^2 + 2\gamma M r_d - L^2} - \sqrt{-2er_o^2 + 2\gamma M r_o - L^2}}{2e} +$$

$$\frac{\gamma M}{2e\sqrt{2e}}\left(\arcsin\frac{2er_o - \gamma M}{\sqrt{K}} - \arcsin\frac{2er_d - \gamma M}{\sqrt{K}}\right),$$

descending latitude $$DLa = MLa - \frac{\cos\beta}{|\cos\beta|} \cdot \frac{180°}{\pi} \cdot \arcsin(C \cdot R_d),$$

descending longitude $$DLo = MLo + \frac{\sin 2\beta}{|\sin 2\beta|} \cdot \frac{180°}{\pi} \cdot \frac{\sqrt{1-C^2}}{C \cdot \sqrt{1-R_d^2}} \ln \frac{\left|\tan\left(45° - \frac{DLa}{2}\right)\right|}{\left|\tan\left(45° - \frac{MLa}{2}\right)\right|} - \Omega \cdot t_d,$$

descending speed $$V_d = \sqrt{V_o^2 + \frac{2\gamma M}{r_d \cdot r_o} \cdot (r_o - r_d)};$$

outputting predicted projectile flight parameters without necessity of its monitoring by
printing trajectory radial, longitudinal and latitudinal coordinates together with projectile velocities at corresponding times and
plotting 3-D trajectory marking time and speed at desired locations.

* * * * *